(12) United States Patent
Zhang et al.

(10) Patent No.: US 12,506,801 B2
(45) Date of Patent: Dec. 23, 2025

(54) METHOD, ELECTRONIC DEVICE, AND COMPUTER PROGRAM PRODUCT FOR DATA SYNCHRONIZATION

(71) Applicant: Dell Products L.P., Round Rock, TX (US)

(72) Inventors: Yongmei Zhang, Chengdu (CN); Fangbin Zhou, Chengdu (CN); Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 18/582,974

(22) Filed: Feb. 21, 2024

(65) Prior Publication Data

US 2025/0247447 A1 Jul. 31, 2025

(30) Foreign Application Priority Data

Jan. 26, 2024 (CN) .......................... 202410114535.5

(51) Int. Cl.
*H04L 67/1095* (2022.01)
*G06F 3/06* (2006.01)

(52) U.S. Cl.
CPC ........ *H04L 67/1095* (2013.01); *G06F 3/0619* (2013.01); *G06F 3/065* (2013.01); *G06F 3/0653* (2013.01); *G06F 3/0683* (2013.01)

(58) Field of Classification Search
CPC ... H04L 67/1095; G06F 3/0619; G06F 3/065; G06F 3/0653; G06F 3/0683
(Continued)

(56) References Cited

U.S. PATENT DOCUMENTS

| 10,977,275 B1 * | 4/2021 | Bauer ................. G06F 16/2379 |
| 2009/0228570 A1 * | 9/2009 | Janik .................... H02J 7/00047 |
| | | 709/217 |

(Continued)

FOREIGN PATENT DOCUMENTS

| CN | 113360514 A | * | 9/2021 | ........... G06F 18/214 |
| CN | 115129780 A | * | 9/2022 | ............. G06F 16/23 |
| CN | 117234410 A | * | 12/2023 | ............... G06F 3/06 |

OTHER PUBLICATIONS

Machine translation of CN-113360514-A (Year: 2021).*

(Continued)

*Primary Examiner* — Ruolei Zong
(74) *Attorney, Agent, or Firm* — Ryan, Mason & Lewis, LLP

(57) ABSTRACT

Embodiments of the present disclosure relate to a method, an electronic device, and a computer program product for data synchronization. The method includes determining an environment state of a synchronization environment by monitoring an environmental metric for the synchronization environment. The method further includes selecting, based on the determined environment state, a synchronization operation for target data to be synchronized from a synchronization decision database. The method further includes initiating the synchronization operation between a first storage device and a second storage device in the synchronization environment. The method further includes updating the synchronization decision database in response to the synchronization operation being performed.

20 Claims, 7 Drawing Sheets

(58) Field of Classification Search
USPC .......................................................... 709/217
See application file for complete search history.

(56) References Cited

U.S. PATENT DOCUMENTS

| | | | |
|---|---|---|---|
| 2014/0075046 A1* | 3/2014 | Wang | A63F 13/79 709/237 |
| 2017/0235808 A1* | 8/2017 | Salame | H04L 67/1095 707/625 |
| 2019/0207841 A1* | 7/2019 | Perkowski | H04L 43/103 |
| 2021/0232600 A1* | 7/2021 | Bauer | G06F 16/2379 |
| 2022/0284040 A1* | 9/2022 | Celli | G06F 16/278 |

OTHER PUBLICATIONS

Wikipedia, "State-action-reward-state-action," https://en.wikipedia.org/wiki/State-action-reward-state-action, Dec. 13, 2023, 3 pages.

* cited by examiner

| Number of replication source volumes | Write latency | Input/output operations per second | TRIF-288 | Compression rate | Synchronization duration | Transmission size (GB) | unreduced_data_size (GB) | Synchronization rate (MB/s) | Input/output size | io_workload_cpu_utilization (source) | io_workload_cpu_utilization (destination) |
|---|---|---|---|---|---|---|---|---|---|---|---|
| 1 | 1.2 | 6644 | on | 0.75 | 595s | 54.8 | 200 | 94.3 | 4K | ~92% | ~16%-20% |
| 1 | 1.012 | 7871 | on | 0.75 | 643s | 54.8 | 200 | 87.27 | 4K | ~92% | ~16%-20% |
| 1 | 1.662 | 4798 | off | 0.75 | 780s | 200 | 200 | 262.56 | 4K | ~95% | ~16%-20% |
| 1 | 2.983 | 2676 | off | 0.75 | 795s | 200 | 200 | 257.61 | 4K | ~95% | ~16%-20% |
| 16 | 1.592 | 5233.333 | on | 0.75 | 1714.667s | 219.2 (13.7×16) | 800 (50×16) | 118 | 4K | ~93% | ~30%×2 |
| 16 | 1.970333 | 4218.667 | off | 0.75 | 2593s | 800 (50×16) | 800 (50×16) | 118 | 4K | ~93% | ~30%×2 |

METHOD, ELECTRONIC DEVICE, AND COMPUTER PROGRAM PRODUCT FOR DATA SYNCHRONIZATION

RELATED APPLICATION

The present application claims priority to Chinese Patent Application No. 202410114535.5, filed Jan. 26, 2024, and entitled "Method, Electronic Device, and Computer Program Product for Data Synchronization," which is incorporated by reference herein in its entirety.

FIELD

Embodiments of the present disclosure generally relate to the field of storage, and more specifically, to a method, an electronic device, and a computer program product for data synchronization.

BACKGROUND

Data synchronization is an important technology for sharing data between different locations and systems while maintaining data consistency and integrity. With the development of storage technologies and network communication, application scenarios and business requirements of data synchronization are constantly expanding and increasing. An effective data synchronization strategy needs to be adopted to ensure that data to be synchronized can be reliably copied from a local end to an opposite end, and at the same time, it is important that the synchronization process meet strict timeliness and security needs.

Under current practice, data synchronization has been widely applied in various application scenarios and business requirements. For protection purposes, replication and backup technologies are used to synchronize data from, for example, a production site to a remote site, so as to prevent data damage or loss caused by natural disasters or accidents (such as power outages). For storage purposes, compression and deduplication technologies are used to effectively utilize space. For application purposes, data is transmitted between an edge node and a central cloud.

SUMMARY

Embodiments of the present disclosure provide a solution for data synchronization, in which appropriate synchronization operations can be selected for changing synchronization environments through the data synchronization solution, and synchronization feedback is iteratively utilized to enrich synchronization decision knowledge, thereby improving the reliability and efficiency of synchronization.

In a first aspect of the present disclosure, a method for data synchronization is provided. The method includes determining an environment state of a synchronization environment by monitoring an environmental metric for the synchronization environment. The method further includes selecting, based on the determined environment state, a synchronization operation for target data to be synchronized from a synchronization decision database. The method further includes initiating the synchronization operation between a first storage device and a second storage device in the synchronization environment. The method further includes updating the synchronization decision database in response to the synchronization operation being performed.

In another aspect of the present disclosure, an electronic device for data synchronization is provided. The electronic device includes at least one processor and a memory coupled to the at least one processor, with the memory storing instructions, wherein the instructions, when executed by the at least one processor, cause the electronic device to perform actions including: determining an environment state of a synchronization environment by monitoring an environmental metric for the synchronization environment. The actions further include selecting, based on the determined environment state, a synchronization operation for target data to be synchronized from a synchronization decision database. The actions further include initiating the synchronization operation between a first storage device and a second storage device in the synchronization environment. The actions further include updating the synchronization decision database in response to the synchronization operation being performed.

In still another aspect of the present disclosure, a computer program product is provided. The computer program product is tangibly stored on a non-transient computer-readable storage medium and includes machine-executable instructions, wherein the machine-executable instructions, when executed by a machine, cause the machine to perform methods or processes according to embodiments of the present disclosure.

In the solution for data synchronization according to embodiments of the present disclosure, appropriate synchronization operations can be dynamically selected, according to state monitoring for a synchronization environment, for the synchronization environment affected by a plurality of factors. In addition, after a synchronization operation is initiated between a local end and an opposite end, synchronization feedback is utilized to enrich synchronization decision knowledge, and to promote subsequent selections to adapt to changes in the synchronization environment, thereby improving the reliability and efficiency of synchronization.

It should be noted that this Summary is provided to introduce a series of concepts in a simplified manner, and these concepts will be further described in the Detailed Description below. The Summary is neither intended to identify key features or necessary features of the present disclosure, nor intended to limit the scope of the present disclosure.

BRIEF DESCRIPTION OF THE DRAWINGS

By additional description of embodiments of the present disclosure, provided in further detail herein with reference to the accompanying drawings, the above and other objectives, features, and advantages of the present disclosure will become more apparent, in which:

FIG. 4 is a schematic diagram of an example of environmental metrics for a synchronization environment according to an embodiment of the present disclosure;

Throughout all the drawings, the same or similar reference numerals generally represent the same or similar elements.

DETAILED DESCRIPTION

Figure 1:
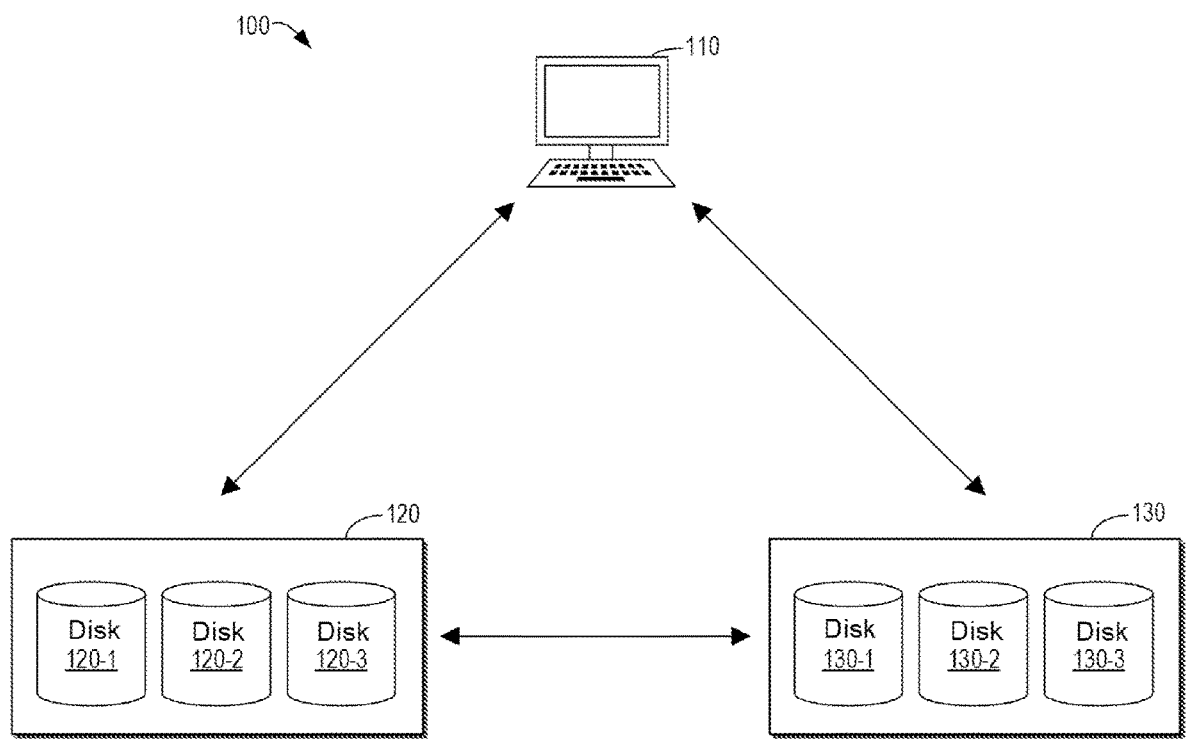
FIG. 1 is a schematic diagram of an example environment in which a method and/or a process according to an embodiment of the present disclosure can be implemented.
Figure 2:
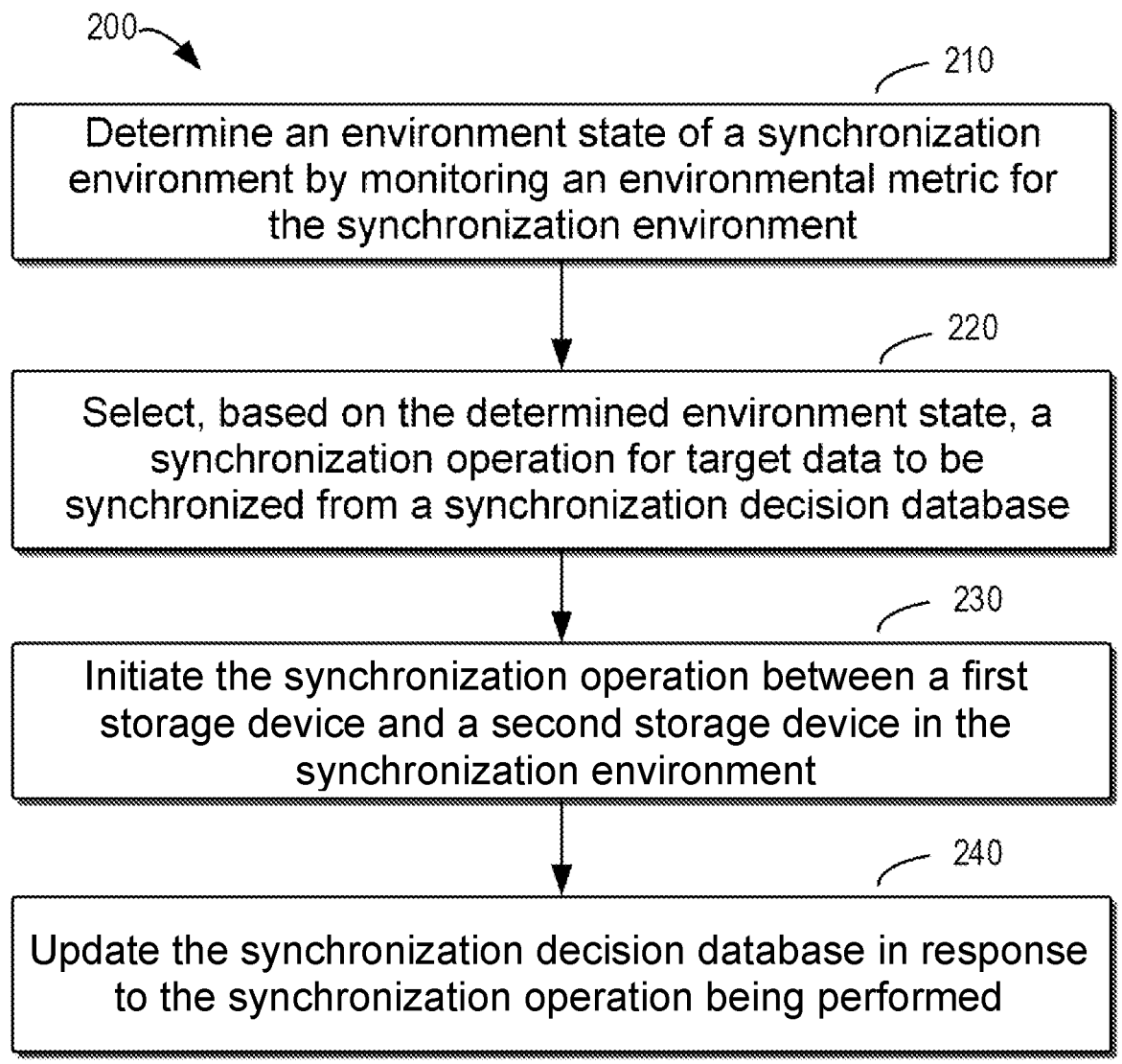
FIG. 2 is a flow chart of a method for data synchronization according to an embodiment of the present disclosure.

Illustrative embodiments of the present disclosure will be described below in further detail with reference to the accompanying drawings. Although certain embodiments of the present disclosure are illustrated in the accompanying drawings, it should be understood that the present disclosure can be implemented in various forms and should not be construed as being limited to the embodiments set forth herein. Rather, these embodiments are provided for more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and its variations should be understood as open-ended inclusion, i.e., "including but not limited to." The term "based on" should be understood as "based at least in part on." The term "one embodiment" or "the embodiment" should be understood as "at least one embodiment." The terms "first," "second," and the like may refer to different or identical objects, unless otherwise specifically indicated.

As mentioned above, with the expanding and increasing application scenarios and business requirements of data synchronization, a solution capable of ensuring that data to be synchronized is reliably and successfully synchronized between one end and the other end (for example, a production end of the data and a remote end (such as a consumption end and a cloud end) different from the production end), while also meeting strict timeliness and security requirements is needed. Such a solution may involve appropriate replication and backup technologies, as well as compression and deduplication technologies, for meeting practical usage needs.

The selection of compression and deduplication strategies is crucial for the performance and efficiency of data synchronization. A related synchronization solution aims to decompress data to be synchronized at a local end and send it to an opposite end. After receiving it, the opposite end compresses the data and writes it to a disk, and the situation is similar for deduplication. This is an implementation with relatively complex steps, because the difficulty in synchronization is increased due to compression and decompression operations at various ends, and at the same time, transmitting decompressed data wastes bandwidth resources. Another solution is directly synchronizing compressed and/or deduplicated data from a local end to an opposite end, but synchronization results thereof may not be satisfactory, for example, reliability degradation may occur.

To solve at least some of the above and other potential problems, an embodiment of the present disclosure provides a solution for data synchronization. The solution includes determining an environment state of a synchronization environment by monitoring an environmental metric for the synchronization environment. The solution further includes selecting, based on the determined environment state, a synchronization operation for target data to be synchronized from a synchronization decision database. The solution further includes initiating the synchronization operation between a first storage device and a second storage device in the synchronization environment. The solution further includes updating the synchronization decision database in response to the synchronization operation being performed. In this way, appropriate synchronization operations can be dynamically selected, according to state monitoring for the synchronization environment, for the synchronization environment affected by a plurality of factors. In addition, after initiating a synchronization operation between a local end and an opposite end, synchronization feedback is utilized to enrich synchronization decision knowledge, and to promote subsequent selections to adapt to changes in the synchronization environment, thereby improving the reliability and efficiency of synchronization.

Basic principles and several example implementations of the present disclosure are described below with reference to FIG. 1 to FIG. 7. It should be understood that these example embodiments are provided merely to enable those skilled in the art to better understand and then implement embodiments of the present disclosure, and are not intended to impose any limitation to the scope of the present disclosure.

FIG. 1 is a schematic diagram of an example environment 100 in which a method and/or a process according to an embodiment of the present disclosure can be implemented. The example environment 100 exemplifies an environment in which target data to be synchronized is synchronized. As shown in FIG. 1, the example environment 100 may include a client device 110, a first storage device 120, and a second storage device 130. It should be understood that a limited number of devices and systems are shown here for the purpose of ease of understanding and illustration, but embodiments of the present disclosure are not limited to this and may also include other constituent components. For example, the example environment 100 may also include one or a plurality of monitoring units (not shown), which can be configured to monitor the example environment 100, such as monitoring network communication conditions within the example environment 100.

According to embodiments of the present disclosure, the client device 110 may initiate a synchronization operation for data synchronization between the first storage device 120 and the second storage device 130 (for example, a synchronization operation from the first storage device 120 to the second storage device 130, or a synchronization operation from the second storage device 130 to the first storage device 120). In other words, data synchronization between the first storage device 120 and the second storage device 130 may be bidirectional. The client device 110 may include the aforementioned monitoring unit, for monitoring the environment in which the synchronization operation is performed on the data to be synchronized, such as but not limited to whether the initiated synchronization operation ends, a network communication condition between the client device 110 and the first storage device 120, a network communication condition between the client device 110 and the second storage device 130, a network communication condition between the first storage device 120 and the second storage device 130, characteristics of the data to be synchronized, configuration of a synchronization process, and other environmental metrics that may affect the data synchronization.

The client device 110 may have computing power corresponding to the data synchronization according to embodiments of the present disclosure, for performing corresponding operations or steps of the method thereon. In some embodiments, the client device 110 may be coupled to the first storage device 120 to form a single system. Similarly, the client device 110 may also be coupled to the second storage device 130 or a combination of the first storage device 120 and the second storage device 130 to form a corresponding storage system.

The client device 110 may include but is not limited to a personal computer, a laptop, a server computer, a mobile device (such as a smartphone and a tablet), a wearable electronic device, a multimedia player, a personal digital assistant (PDA), a smart home device, a consumer electronics product, a distributed computing environment including any one or more of the aforementioned devices, or the like. It should be understood that the client device 110 is schematically shown as one client device in FIG. 1, but this is only for convenience of illustration and ease of understanding. In the example environment 100, more client devices may be arranged according to actual needs.

According to embodiments of the present disclosure, the first storage device 120 and the second storage device 130 may be communicatively coupled (for example, via a line or network), for achieving data synchronization according to embodiments of the present disclosure. The first storage device 120 and the second storage device 130 may include a cluster of storage devices such as a disk array. As shown in FIG. 1, the first storage device 120 includes a plurality of disks 120-1, 120-2, 120-3, and the like, and the second storage device 130 includes a plurality of disks 130-1, 130-2, 130-3, and the like. The storage devices 120 and 130 may be geographically separated from each other and may provide a requested storage space through management software of a distributed storage system (for example, installed on the client device 110).

It should be understood that the storage devices 120 and 130 illustrated in FIG. 1 and the disks included therein are only illustrative, and the scope of the present disclosure is not limited in this regard. For example, the example environment 100 may include more or fewer storage devices, where each storage device may include more or fewer disks. In an exemplary rather than restrictive manner, examples of the disks may include hard disk drives (HDDs), solid-state drives (SSDs), solid-state hybrid drives (SSHDs), and the like, and are coupled together, for example, through a line or network. It should be understood that appropriate types of disks may be used according to specific usage needs.

The example environment 100 in which the method and/or process according to an embodiment of the present disclosure may be implemented has been described above with reference to FIG. 1. A flow chart of a method 200 for data synchronization according to an embodiment of the present disclosure will be described below with reference to FIG. 2. Through the method 200, changes in the synchronization environment affected by a plurality of factors being monitored can be captured, appropriate synchronization operations are then selected for it, and synchronization feedback is iteratively utilized to enrich synchronization decision knowledge, for better adapting to the changes in the synchronization environment.

At block 210, an environment state of the synchronization environment is determined by monitoring an environmental metric for the synchronization environment. According to embodiments of the present disclosure, the synchronization environment (for example, the example environment 100 illustrated in FIG. 1) affected by a plurality of factors (such as latency) may exhibit different states during the synchronization process. By monitoring the environmental metric for the synchronization environment, the environment state of the synchronization environment can be better understood, thereby adjusting a synchronization strategy to be implemented. In the following, environmental metric monitoring and environment state identification according to embodiments of the present disclosure will be described in further detail.

At block 220, based on the determined environment state, a synchronization operation for target data to be synchronized is selected from a synchronization decision database. According to embodiments of the present disclosure, based on a deep understanding of the environment state, associated synchronization decision knowledge in the synchronization decision database facilitates the selection of a synchronization operation corresponding to the determined environment state. This decision-making process is dynamic and can make corresponding adjustments according to changes in the environment. In some embodiments, the synchronization decision database may include a large amount of historical and empirical data, which has a reference value for selecting suitable synchronization operations. In the following, the synchronization decision database according to embodiments of the present disclosure will be described in further detail.

At block 230, the synchronization operation is initiated between the first storage device and the second storage device in the synchronization environment. According to embodiments of the present disclosure, an appropriate synchronization operation corresponding to the determined environment state is initiated between the first storage device and the second storage device, which improves the performance of data synchronization, such as saving bandwidth resources while ensuring data consistency and integrity.

At block 240, the synchronization decision database is updated in response to the synchronization operation being performed. After the synchronization operation adapted to the synchronization environment is performed, the performance of data synchronization, such as the synchronization-based timeliness or the integrity and consistency of data after synchronization, will be evaluated. If the performance evaluated is good, the same or similar synchronization operation may be selected in the next occurrence of a similar environment state, for achieving the expected synchronization performance. If the performance evaluated is poor, the synchronization operation or such type of different operations will be avoided in the next occurrence of a similar environment state. Next, the determined synchronization state and synchronization performance evaluated for the selected synchronization operation will be added as supplementary synchronization decision knowledge to the synchronization decision database for subsequent synchronization decisions. In this way, synchronization feedback is iteratively utilized to enrich the synchronization decision knowledge. The selection of synchronization operations will become increasingly intelligent and adaptable to various complex environmental changes.

In the method 200 for data synchronization according to embodiments of the present disclosure, appropriate synchronization operations can be dynamically selected, according to state monitoring for the synchronization environment, for the synchronization environment affected by a plurality of factors. In addition, after initiating a synchronization operation between a local end and an opposite end, synchronization feedback is utilized to enrich synchronization decision knowledge, and to promote subsequent selections to adapt to changes in the synchronization environment, thereby improving the reliability and efficiency of synchronization.

Figure 3:
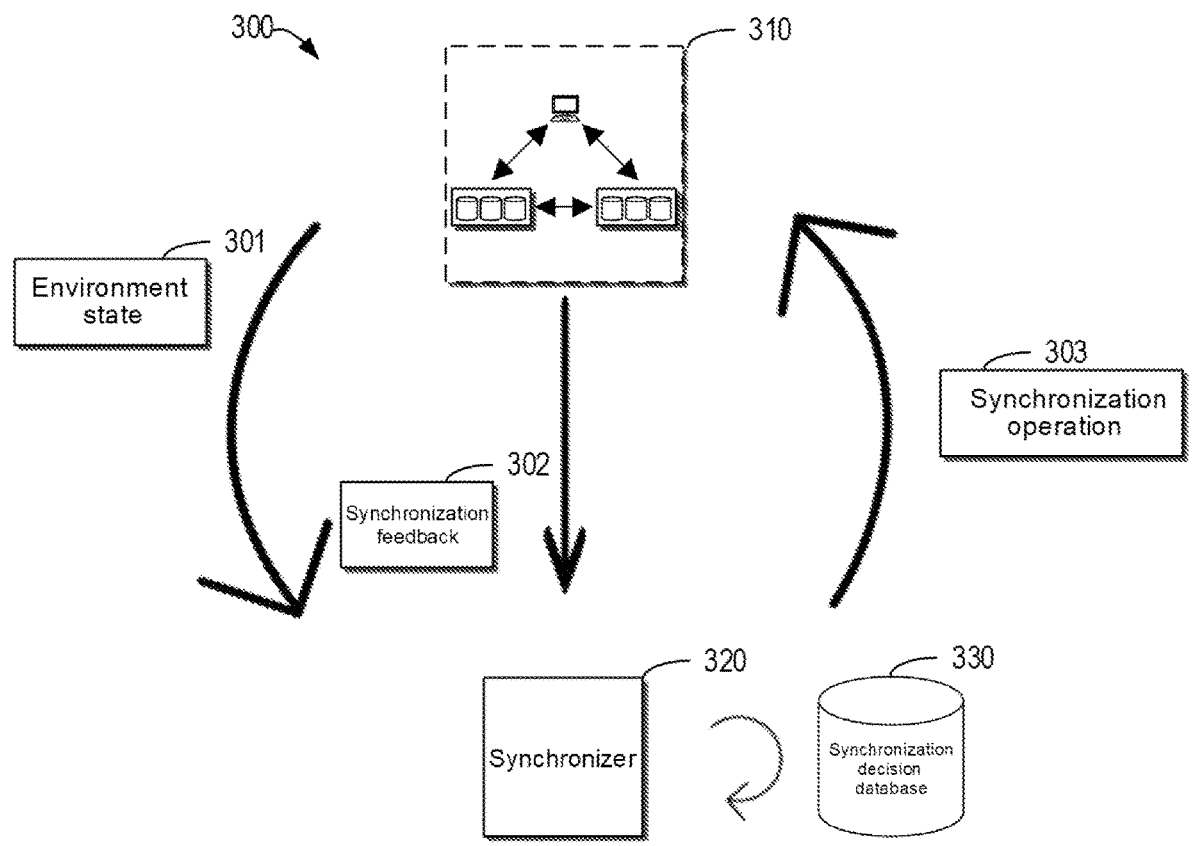
FIG. 3 is a schematic diagram of a data synchronization process according to an embodiment of the present disclosure.

FIG. 3 is a schematic diagram of a data synchronization process 300 according to an embodiment of the present disclosure. As shown in FIG. 3, a synchronization environment 310, a synchronizer 320, and a synchronization decision database 330 may interact with each other. The synchronizer 320 shown in FIG. 3, as well as sub-processes indicated by the arrows for the data synchronization process 300, may be implemented based on software, and may be run on a device having computing power (such as the client device 110). The synchronization decision database 330 may be deployed so as to be accessible by the synchronizer 320. In addition, an environment state 301, synchronization feedback 302, and a synchronization operation 303, after receiving and transmitting, may be cached for future use.

As shown in FIG. 3, the synchronizer 320 may be configured to determine the environment state 301 of the synchronization environment 310. According to embodiments of the present disclosure, the synchronizer 320 may capture metric values of monitored environmental metrics for the synchronization environment 310 at each moment in at least one moment. The metric values of these metrics will change due to changes in the environment, and therefore, capturing the metric values of the environmental metrics at a frequency that is set depending on the monitoring accuracy is necessary for understanding the environment state 301 of the synchronization environment 310.

According to embodiments of the present disclosure, the environmental metric for the synchronization environment 310 includes one or a plurality of the following: array configuration, system state, network state, transmitted data size, unreduced data size, compression rate, and data block size; wherein the array configuration includes the number of volumes, the number of asynchronous replication sessions, and an asynchronous replication recovery point object (RPO); the system state includes a utilization rate of a central processing unit (CPU); and the network state includes write latency and input/output operations per second (IOPS). An exemplary description of the environmental metric for the synchronization environment 310 will be provided below with reference to FIG. 4.

FIG. 4 is a schematic diagram of an example 400 of the environmental metrics for the synchronization environment 310 according to an embodiment of the present disclosure. It should be understood that the metric values of the monitored environmental metrics are presented here in the form of structured data, but this is exemplary rather than restrictive, and there may be other forms of collection and organization for them. In addition, FIG. 4 only shows a limited number of environmental metrics for the synchronization environment 310, which is for the purpose of ease of understanding and illustration. More or fewer environmental metrics may be selected according to the monitoring accuracy.

As shown in FIG. 4, the $1^{st}$ to $3^{rd}$ columns of the example 400 show the number of replication source volumes, the write latency, and the input/output operations per second monitored at a plurality of moments, respectively. The plurality of moments described here may be separated by the same time period (for example, a time period corresponding to the RPO), that is, the environmental metrics for the synchronization environment 310 are monitored at a predetermined frequency. The 4th to 6th columns of the example 400 respectively show "TRIF-288," the compression rate, and the synchronization duration monitored at a plurality of moments, wherein the "TRIF-288" indicates compression and deduplication strategies of the synchronization process, which is also referred to as a compression transfer switch in the following text. The $7^{th}$ to $9^{th}$ columns of the example 400 respectively show the transmitted data size, unreduced_data_size (the unreduced data size), and the synchronization rate monitored at a plurality of moments, wherein the unreduced_data_size refers to the size of the data to be synchronized when uncompressed. In addition, the $10^{th}$ to $12^{th}$ columns of the example 400 respectively show the input/output size (that is, the size of the data block), io_workload_cpu_utilization (source), and io_workload_cpu_utilization (destination), wherein the io_workload_cpu_utilization (source) and io_workload_cpu_utilization (destination) indicate the CPU utilization rate of the local end and the opposite end, respectively.

Referring back to FIG. 3, according to embodiments of the present disclosure, the synchronizer 320 may assign a weight to each moment in the at least one moment, and a sum of the assigned weights is equal to one. In some application scenarios, the importance of different moments varies, and there is a tendency to pay more attention to more important moments, wherein the sum of weight values assigned to the various moments is equal to one. In addition, the synchronizer 320 may determine, by weighted averaging the metric values of the environmental metrics captured at each moment based on the assigned weights, the environment state 301 for the synchronization environment 310 of a time period including the at least one moment. In this way, the weighted average of the metric values of the environmental metrics monitored at the plurality of moments may be used to characterize the environment state 301 of the synchronization environment 310 during this time period (also referred to as an episode in the following text).

In an exemplary rather than restrictive manner, an example of the environment state 301 of the synchronization environment 310 is characterized by using metric values of the environmental metrics of the synchronization environment 310 at the current moment t, a moment $t_{RPO/2}$ of ½ of a time period corresponding to the RPO before the moment t, and a moment $t_{RPO}$ of a time period corresponding to the RPO before the moment t, which is shown in the following formula (1):

$$I_t = \omega_{now} \cdot I_{now} + \omega_{RPO/2} \cdot I_{RPO/2} + \omega_{RPO} \cdot I_{RPO} \qquad (1)$$

wherein $I_t$ indicates the environment state of the synchronization environment 310 for an episode to the moment t, $\omega_{now}$ is a weight for the current moment, $I_{now}$ is the metric value of the environmental metric monitored at the current moment, $\omega_{RPO/2}$ is the weight for the moment $t_{RPO/2}$, $I_{RPO/2}$ is the metric value of the environmental metric monitored at the moment $t_{RPO/2}$, $\omega_{RPO}$ is the weight for the moment $t_{RPO}$, and $I_{RPO}$ is the metric value of the environmental metric monitored at the moment $t_{RPO}$, wherein $\omega_{now}+\omega_{RPO/2}+\omega_{RPO}=1$, for example, values of $\omega_{now}$, $\omega_{RPO/2}$, and $\omega_{RPO}$ are 0.5, 0.3, and 0.2, respectively.

According to embodiments of the present disclosure, for example, the synchronization operation 303 between the first storage device 120 and the second storage device 130 may include a first synchronization operation and a second synchronization operation. The first synchronization operation may include decompressing the compressed target data (data to be synchronized between the first storage device 120 and the second storage device 130) at one of the first storage devices 120 and the second storage device 130, then transmitting the decompressed target data to the other of the first storage device 120 and the second storage device 130, and compressing, in response to receiving the decompressed target data, the decompressed target data at the other of the first storage device 120 and the second storage device 130 and storing it. In other words, the method is first decompressing and then transmitting. In addition, the second synchronization operation may include transferring the compressed target data from one of the first storage device and the second storage device to the other and storing it. In other words, the method is directly transmitting without decompressing. It should be understood that for the purpose of ease of understanding, only the first synchronization operation and the second synchronization operation are provided as examples, but embodiments of the present disclosure are not limited to this. For example, a combination of the first synchronization operation and the second synchronization operation, as well as other different operations, may also be used.

As shown in FIG. 3, in response to the synchronizer 320 determining the environment state 301 of a target episode, the synchronizer 320 may acquire associated synchronization decision knowledge from the synchronization decision database 330 for decision-making. According to embodiments of the present disclosure, the synchronization decision database 330 includes a plurality of synchronization reference records, and each of the synchronization reference records includes a reference environment state of the synchronization environment 310, as well as a first synchronization operation score and a second synchronization operation score corresponding to the reference environment state. The first synchronization operation score indicates a duration required to perform the first synchronization operation to synchronize the target data in the reference environment state, and the second synchronization operation score indicates a duration required to perform the second synchronization operation to synchronize the target data in the reference environment state. It should be understood that the synchronization operation score indicates the performance of performing the corresponding synchronization operation in the environment state 301, and is not limited to the synchronization duration. For example, the integrity and reliability of the target data after synchronization may also be considered. An example of the synchronization reference records is provided in Table 1 below.

TABLE 1

| Reference environment state | First operation score | Second operation score | |
| --- | --- | --- | --- |
| $S_t$ | $Q_t$ | $Q'_t$ | ... |
| $S_{t+1}$ | $Q_{t+1}$ | $Q'_{t+1}$ | ... |
| $S_{t+2}$ | $Q_{t+2}$ | $Q'_{t+2}$ | ... |
| ... | ... | ... | ... |

Here, the synchronization reference records are presented in the form of structured data, but this is exemplary rather than restrictive, and other forms of collection and organization of the synchronization reference records may exist. In Table 1, a row of the table serves as an entry indicating a synchronization reference record, which includes the reference environment state (which may be a vector or dimensionally reduced to a single value), the first synchronization operation score, and the second synchronization operation score. It should be understood that only a limited number of synchronization reference records are shown here, which is for the sake of ease of understanding. The synchronization decision database 330 may also include more or fewer synchronization reference records. In the following text, the process of selecting the synchronization operation 303 for the target data to be synchronized from the synchronization decision database 330 according to embodiments of the present disclosure will be further described in detail.

According to embodiments of the present disclosure, after determining the environment state 301 of the synchronization environment 310, the synchronizer 320 may acquire, by comparing the determined environment state 301 with the reference environment state included in each synchronization reference record (such as the first column in Table 1), a similarity between the environment state and the reference environment state. Then, the reference environment state with the maximum similarity to the environment state 301 may be identified as a target reference environment state, and a first target synchronization operation score and a second synchronization operation score corresponding to the target reference environment state may be determined.

In an exemplary rather than restrictive manner, if the determined environment state 301 is most similar (having the maximum similarity) to the reference environment state $S_t$ in the first synchronization reference record, the reference environment state $S_t$ may be identified as the target reference environment state, and the first operation score $Q_t$ and the second operation score $Q'_t$ corresponding to the reference environment state $S_t$ may be determined. It should be understood that in addition to determining the reference environment state that is most similar to the determined environment state 301, one or a plurality of reference environment states whose similarity is within a predetermined threshold range may also be selected. The scope of the present disclosure is not limited in this regard.

According to embodiments of the present disclosure, the first synchronization operation may be selected in response to the first target synchronization operation score corresponding to the target reference environment state being greater than the second synchronization operation score corresponding to the target reference environment state, and the second synchronization operation may be selected in response to the first target synchronization operation score corresponding to the target reference environment state being less than or equal to the second synchronization operation score corresponding to the target reference environment state.

The synchronization operation score in each synchronization reference record indicates the performance, such as the time required for the synchronization or the integrity of the target data after synchronization, presented by performing of the synchronization operation corresponding to the synchronization operation score respectively to synchronize the target data in the corresponding reference environment state. As described above, the first synchronization operation score indicates the duration required to perform the first synchronization operation to synchronize the target data in the reference environment state, and the second synchronization operation score indicates the duration required to perform the second synchronization operation to synchronize the target data in the reference environment state.

According to embodiments of the present disclosure, in response to the first target synchronization operation score corresponding to the target reference environment state being greater than the second synchronization operation score corresponding to the target reference environment state, the first synchronization operation may be selected. In other words, in the determined environment state 301, the performance of performing the first synchronization operation is better than that of performing the second synchronization operation, and the method of decompressing and then transmitting is adopted between storage nodes. In addition, in response to the first target synchronization operation score corresponding to the target reference environment state being less than or equal to the second synchronization operation score corresponding to the target reference environment state, the second synchronization operation is selected. In other words, in the determined environment state 301, the performance of performing the second synchronization operation is better than that of performing the first synchronization operation, and the method of direct transmitting without decompressing is adopted between storage nodes. When the scores are equal, transmitting the compressed data by using the method of direct transmitting without decompressing can save bandwidth resources to a certain extent.

In response to the determined synchronization operation being performed, the synchronization feedback 302 may be used to update the synchronization decision database 330, wherein the synchronization feedback 302 may be the metric for embodying the synchronization performance such as the duration of performing the determined synchronization operation to synchronize the target data, or the integrity and consistency of the target data after synchronization. According to embodiments of the present disclosure, based on the determined environment state 301 and the duration consumed to perform the selected synchronization operation to synchronize the target data, an additional synchronization reference record may be formed, and the formed additional synchronization reference record may be added to the synchronization decision database. In this way, the synchronization feedback may be iteratively utilized to enrich the synchronization decision knowledge, thereby improving the reliability and efficiency of the synchronization.

Figure 5:
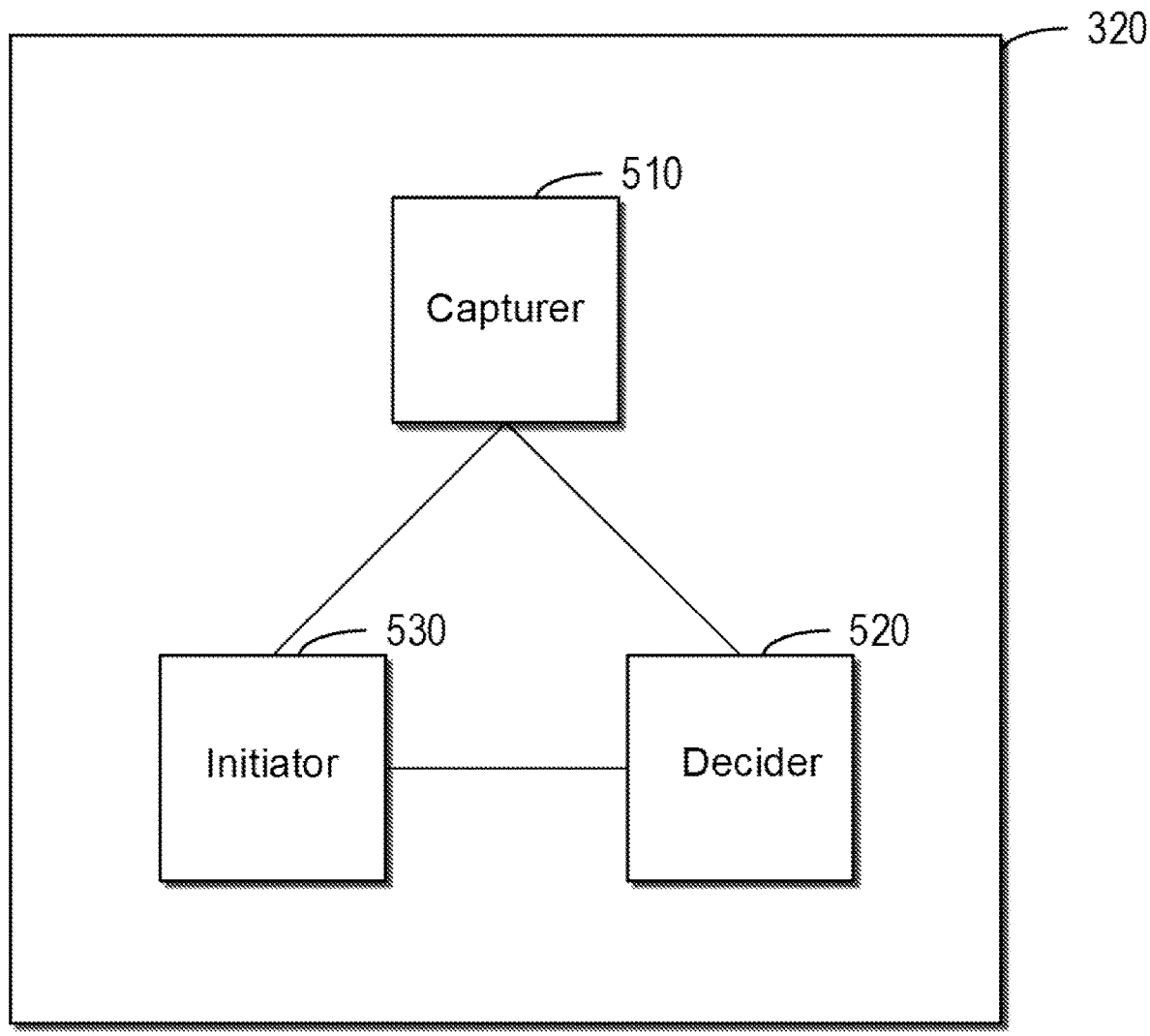
FIG. 5 is a schematic diagram of example composition of a synchronizer according to an embodiment of the present disclosure.

FIG. 5 is a schematic diagram of example composition of a synchronizer 320 according to an embodiment of the present disclosure. As shown in FIG. 5, the synchronizer 320 may include a capturer 510, a decider 520, and an initiator 530, which are coupled to each other for data synchronization according to embodiments of the present disclosure. These units or subsystems may be implemented based on software and may run on a device with computing power (such as the client device 110). It should be understood that a limited number of units and subsystems being an exemplary fine classification of the synchronizer 320 are shown here for the purpose of ease of understanding and illustration, but embodiments of the present disclosure are not limited to this and may also include other constituent components.

In some embodiments, the capturer 510 may be configured to capture metric values of environmental metrics characterizing the environment state 301 of the episode from the synchronization environment 310 at a plurality of moments, and perform data processing (such as normalization and dimensionality reduction) on the captured data. Based on the environment state 301 from the capturer 510, the decider 520 may be configured to select synchronization operations suitable for the environment state 301 based on the synchronization decision knowledge in the synchronization decision database 330. In addition, the initiator 530 may be configured to initiate the selected synchronization operations between various storage nodes. The operations and steps of the capturer 510, the decider 520, and the initiator 530 may be as those described above with reference to FIG. 3.

Figure 6:
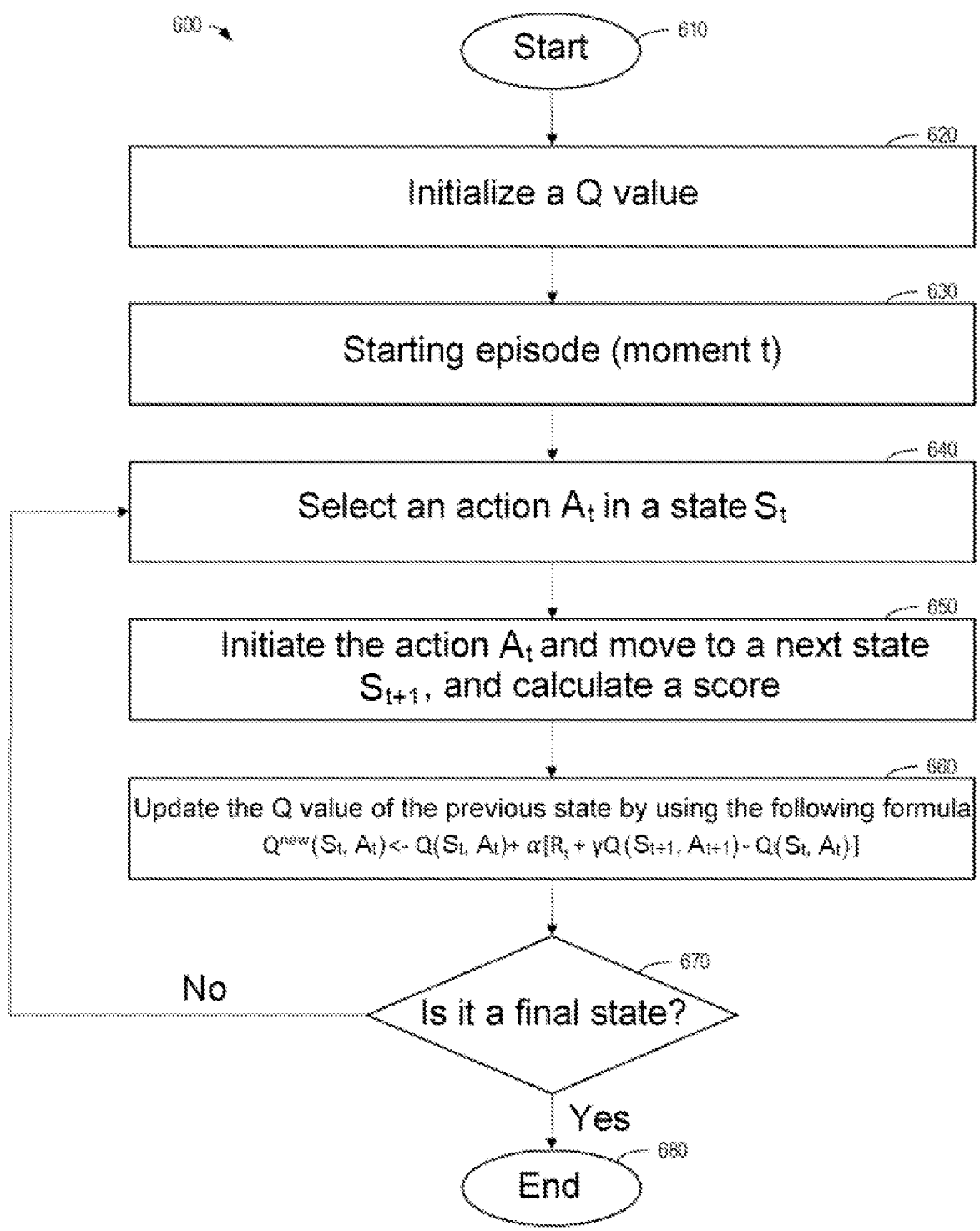
FIG. 6 is a flow chart of a data synchronization workflow according to an embodiment of the present disclosure.

FIG. 6 is a flow chart of a data synchronization workflow 600 according to an embodiment of the present disclosure. At 610, the entire workflow is started. At 620, a corresponding synchronization operation score (also referred to as a Q value in the following text) for a synchronization operation is initialized. At 630, a starting episode is described here by taking an episode that is a predetermined time period to a moment t as a non-limiting example. At 640, an action $A_t$ to be used for synchronization in a state $S_t$ of the episode is selected. At 650, the action $A_t$ is initiated and moved to the next state $S_{t+1}$, and a reward score $R_t$ (which may be positive or negative) for performing the action $A_t$ in the state $S_t$ is calculated. At 660, the Q value of the state $S_t$ is updated, which indicates the performance of performing the action $A_t$ in the state $S_t$. The calculation process is shown exemplarily by the following formula (2):

$$Q^{new}(S_t, A_t) \leftarrow Q(S_t, A_t) + \alpha[R_t + \gamma Q(S_{t+1}, A_{t+1}) - Q(S_t, A_t)] \quad (2)$$

The Q value may indicate a possible predicted score of performing an action $A_{t+1}$ in a state $S_{t+1}$ in the next episode, plus a reward score $R_{t+1}$ observed based on the performing of the action $A_{t+1}$. In other words, the Q value may be corrected based on the deviation observed from the performing of the predicted action, and such deviation may be a positive or negative feedback. For example, at 660, the Q value of the previous episode (state $S_t$, action $A_t$) is updated by using the reward score $R_t$. In the formula (2), $\alpha$ is the learning rate, which determines the degree to which newly acquired information overlaps old information, and $\gamma$ is a reward factor that indicates the importance of the reward used for compensation. Next, at 670, it is determined whether it is a final state. At 670, if the determination is yes, the entire workflow ends at 680; and if the determination is no, the procedure returns to 640 to continue with another iteration.

Figure 7:
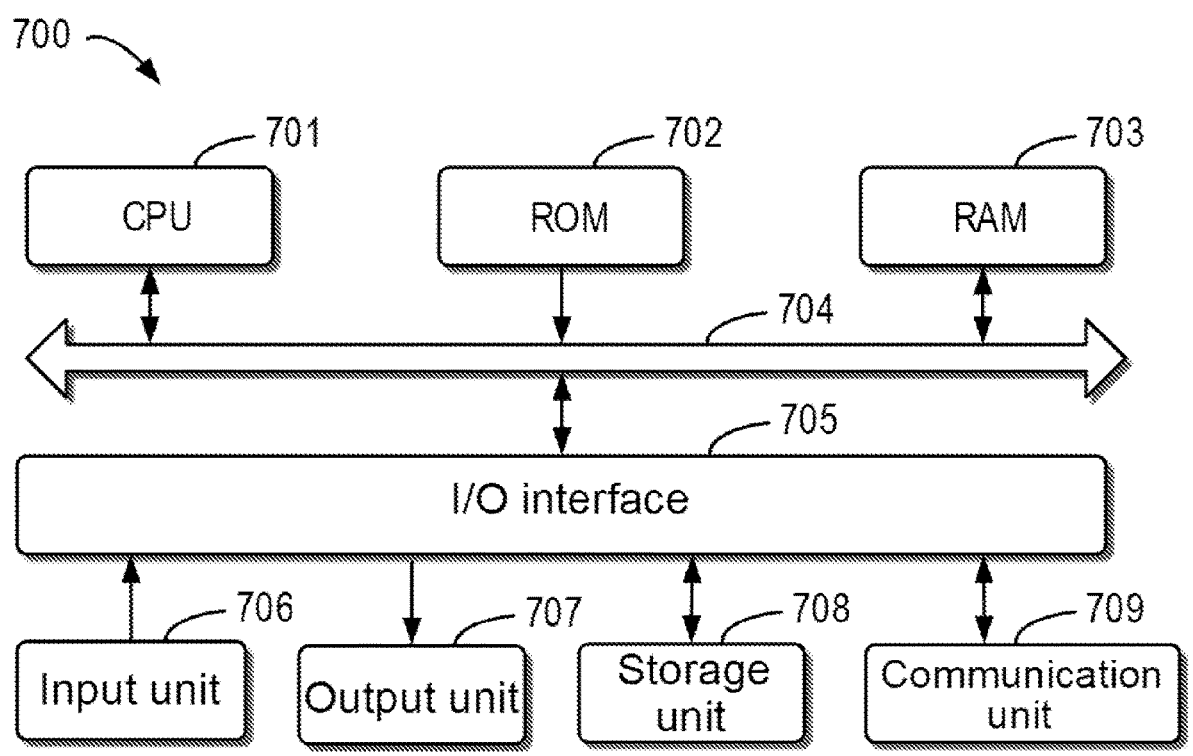
FIG. 7 is a block diagram of an example device that may be used to implement an embodiment of the present disclosure.

FIG. 7 is a block diagram of an example device 700 that may be used for implementing some embodiments according to the present disclosure. As shown FIG. 7, the device 700 includes a central processing unit (CPU) 701, which may execute various appropriate actions and processing in accordance with computer program instructions stored in a read-only memory (ROM) 702 or computer program instructions loaded from a storage unit 708 into a random access memory (RAM) 703. Various programs and data required for the operation of the device 700 may also be stored in the RAM 703. The CPU 701, the ROM 702, and the RAM 703 are connected to each other through a bus 704. An input/output (I/O) interface 705 is also connected to the bus 704.

A plurality of components in the device 700 are connected to the I/O interface 705, including: an input unit 706, such as a keyboard and a mouse; an output unit 707, such as various types of displays and speakers; the storage unit 708, such as a magnetic disk and an optical disc; and a communication unit 709, such as a network card, a modem, and a wireless communication transceiver. The communication unit 709 allows the device 700 to exchange information/data with other devices via a computer network such as the Internet and/or various telecommunication networks.

The various processes and processing described above, such as the method 200, may be performed by the CPU 701. For example, in some embodiments, the method 200 may be implemented as a computer software program that is tangibly included in a machine-readable medium such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more actions of the method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored thereon includes an article of manufacture that includes instructions that implement various aspects of the functions/actions specified in one or more blocks in the flow charts and/or block diagrams.

The computer-readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technical improvements, so as to enable persons of ordinary skill in the art to understand the embodiments disclosed herein.

What is claimed is:

1. A method comprising:
   determining an environment state of a synchronization environment by monitoring an environmental metric for the synchronization environment;
   selecting, based on the determined environment state, a synchronization operation for target data to be synchronized from a synchronization decision database;
   initiating the synchronization operation between a first storage device and a second storage device in the synchronization environment; and
   updating the synchronization decision database in response to the synchronization operation being performed;
   wherein the synchronization operation is selected from a plurality of distinct synchronization operations based on the determined environment state and a plurality of synchronization operation scores generated for respective ones of the synchronization operations utilizing a reward-based iterative learning process.

2. The method according to claim 1, wherein determining the environment state of the synchronization environment comprises:
   capturing a metric value of the environmental metric at each moment in at least one moment;
   assigning a weight for each moment in the at least one moment, wherein a sum of the assigned weights is equal to one; and
   determining, by weighted averaging the metric value captured at each moment based on the assigned weights, the environment state for a time period comprising the at least one moment.

3. The method according to claim 1, wherein the environmental metric comprises one or a plurality of: array configuration, system state, network state, transmitted data size, unreduced data size, compression rate, and data block size; and
   wherein the array configuration comprises a number of volumes, a number of asynchronous replication sessions, and an asynchronous replication recovery point object (RPO);
   the system state comprises a utilization rate of a central processing unit (CPU); and
   the network state comprises write latency and input/output operations per second (IOPS).

4. The method according to claim 1, wherein the synchronization operation comprises a first synchronization operation and a second synchronization operation,
   the first synchronization operation comprises:
   decompressing compressed target data at one of the first storage device and the second storage device;
   transferring decompressed target data to the other of the first storage device and the second storage device; and
   compressing, in response to receiving the decompressed target data, the decompressed target data at the other of the first storage device and the second storage device and storing it, and
   the second synchronization operation comprises:
   transferring the compressed target data from one of the first storage device and the second storage device to the other and storing it.

5. The method according to claim 4, wherein the synchronization decision database comprises a plurality of synchronization reference records, each synchronization reference record of the synchronization reference records comprises a reference environment state of the synchronization environment, as well as a first synchronization operation score and a second synchronization operation score corresponding to the reference environment state,
   the first synchronization operation score indicates a duration required to perform the first synchronization operation to synchronize the target data in the reference environment state, and
   the second synchronization operation score indicates a duration required to perform the second synchronization operation to synchronize the target data in the reference environment state.

6. The method according to claim 5, further comprising:
   acquiring, by comparing the determined environment state with the reference environment state comprised in each synchronization reference record, a similarity between the environment state and the reference environment state;
   identifying the reference environment state with the maximum similarity to the environment state as a target reference environment state; and
   determining a first target synchronization operation score and a second synchronization operation score corresponding to the target reference environment state.

7. The method according to claim 6, wherein selecting the synchronization operation for the target data to be synchronized from the synchronization decision database comprises:
   selecting the first synchronization operation in response to the first target synchronization operation score corresponding to the target reference environment state being greater than the second synchronization operation score corresponding to the target reference environment state; and
   selecting the second synchronization operation in response to the first target synchronization operation score corresponding to the target reference environment state being less than or equal to the second synchronization operation score corresponding to the target reference environment state.

8. The method according to claim 1, wherein updating the synchronization decision database comprises:
   forming an additional synchronization reference record based on the determined environment state and a duration consumed to perform the selected synchronization operation to synchronize the target data; and
   adding the formed additional synchronization reference record to the synchronization decision database.

9. An electronic device, comprising:
   at least one processor; and
   memory, the memory being coupled to the at least one processor and storing instructions, wherein the instructions, when executed by the at least one processor, cause the electronic device to perform actions comprising:

determining an environment state of a synchronization environment by monitoring an environmental metric for the synchronization environment;

selecting, based on the determined environment state, a synchronization operation for target data to be synchronized from a synchronization decision database;

initiating the synchronization operation between a first storage device and a second storage device in the synchronization environment; and updating the synchronization decision database in response to the synchronization operation being performed;

wherein the synchronization operation is selected from a plurality of distinct synchronization operations based on the determined environment state and a plurality of synchronization operation scores generated for respective ones of the synchronization operations utilizing a reward-based iterative learning process.

10. The electronic device according to claim 9, wherein determining the environment state of the synchronization environment comprises:

capturing a metric value of the environmental metric at each moment in at least one moment;

assigning a weight for each moment in the at least one moment, wherein a sum of the assigned weights is equal to one; and determining, by weighted averaging the metric value captured at each moment based on the assigned weights, the environment state for a time period comprising the at least one moment.

11. The electronic device according to claim 9, wherein the environmental metric comprises one or a plurality of: array configuration, system state, network state, transmitted data size, unreduced data size, compression rate, and data block size; and wherein the array configuration comprises a number of volumes, a number of asynchronous replication sessions, and an asynchronous replication recovery point object (RPO);

the system state comprises a utilization rate of a central processing unit (CPU); and the network state comprises write latency and input/output operations per second (IOPS).

12. The electronic device according to claim 9, wherein the synchronization operation comprises a first synchronization operation and a second synchronization operation, the first synchronization operation comprises:

decompressing compressed target data at one of the first storage device and the second storage device;

transferring decompressed target data to the other of the first storage device and the second storage device; and compressing, in response to receiving the decompressed target data, the decompressed target data at the other of the first storage device and the second storage device and storing it, and the second synchronization operation comprises:

transferring the compressed target data from one of the first storage device and the second storage device to the other and storing it.

13. The electronic device according to claim 12, wherein the synchronization decision database comprises a plurality of synchronization reference records, each synchronization reference record of the synchronization reference records comprises a reference environment state of the synchronization environment, as well as a first synchronization operation score and a second synchronization operation score corresponding to the reference environment state, the first synchronization operation score indicates a duration required to perform the first synchronization operation to synchronize the target data in the reference environment state, and the second synchronization operation score indicates a duration required to perform the second synchronization operation to synchronize the target data in the reference environment state.

14. The electronic device according to claim 13, wherein the actions further comprise:

acquiring, by comparing the determined environment state with the reference environment state comprised in each synchronization reference record, a similarity between the environment state and the reference environment state;

identifying the reference environment state with the maximum similarity to the environment state as a target reference environment state; and determining a first target synchronization operation score and a second synchronization operation score corresponding to the target reference environment state.

15. The electronic device according to claim 14, wherein selecting the synchronization operation for the target data to be synchronized from the synchronization decision database comprises:

selecting the first synchronization operation in response to the first target synchronization operation score corresponding to the target reference environment state being greater than the second synchronization operation score corresponding to the target reference environment state; and selecting the second synchronization operation in response to the first target synchronization operation score corresponding to the target reference environment state being less than or equal to the second synchronization operation score corresponding to the target reference environment state.

16. The electronic device according to claim 9, wherein updating the synchronization decision database comprises:

forming an additional synchronization reference record based on the determined environment state and a duration consumed to perform the selected synchronization operation to synchronize the target data; and adding the formed additional synchronization reference record to the synchronization decision database.

17. A computer program product comprising a non-transient computer-readable medium having machine-executable instructions stored therein, wherein the machine-executable instructions, when executed by a machine, cause the machine to perform actions comprising:

determining an environment state of a synchronization environment by monitoring an environmental metric for the synchronization environment;

selecting, based on the determined environment state, a synchronization operation for target data to be synchronized from a synchronization decision database;

initiating the synchronization operation between a first storage device and a second storage device in the synchronization environment; and updating the synchronization decision database in response to the synchronization operation being performed;

wherein the synchronization operation is selected from a plurality of distinct synchronization operations based on the determined environment state and a plurality of synchronization operation scores generated for respective ones of the synchronization operations utilizing a reward-based iterative learning process.

18. The computer program product according to claim 17, wherein determining the environment state of the synchronization environment comprises:
   capturing a metric value of the environmental metric at each moment in at least one moment;
   assigning a weight for each moment in the at least one moment, wherein a sum of the assigned weights is equal to one; and
   determining, by weighted averaging the metric value captured at each moment based on the assigned weights, the environment state for a time period comprising the at least one moment.

19. The computer program product according to claim 17, wherein the actions further comprise:
   acquiring, by comparing the determined environment state with a reference environment state in each synchronization reference record of a plurality of synchronization reference records in the synchronization decision database, a similarity between the environment state and the reference environment state;
   identifying the reference environment state with the maximum similarity to the environment state as a target reference environment state; and
   determining a first target synchronization operation score and a second synchronization operation score in the synchronization reference record comprising the target reference environment state.

20. The computer program product according to claim 17, wherein updating the synchronization decision database comprises:
   forming an additional synchronization reference record based on the determined environment state and a duration consumed to perform the selected synchronization operation to synchronize the target data; and
   adding the formed additional synchronization reference record to the synchronization decision database.

\* \* \* \* \*